Aug. 9, 1932.  N. R. CAMPBELL  1,870,280
MANUFACTURE OF PHOTO-ELECTRIC TUBES
Filed Dec. 1, 1928
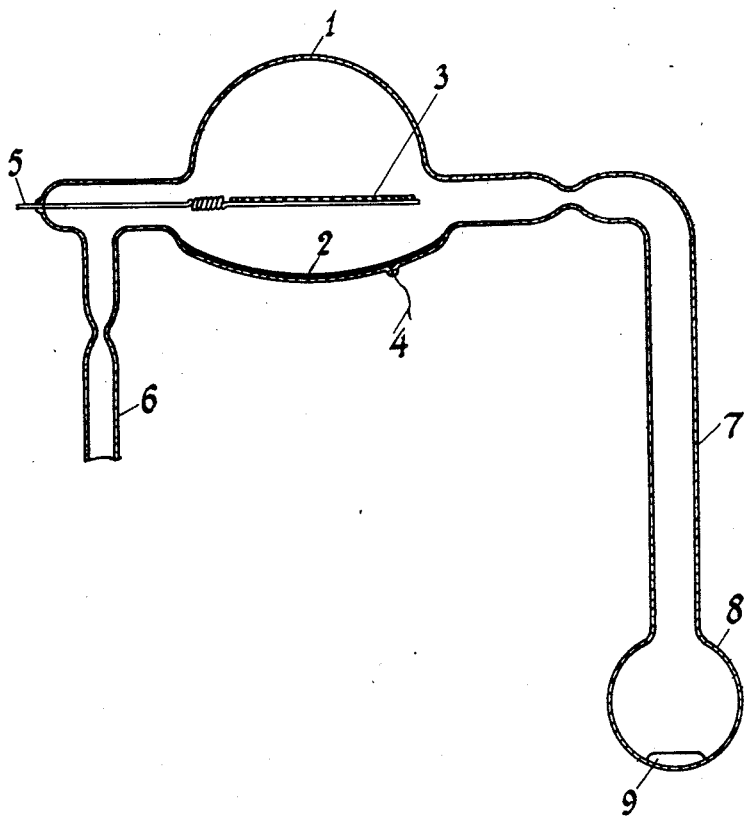
Inventor,
Norman R. Campbell
M. H. Lockwood
Attorney.

Patented Aug. 9, 1932

1,870,280

UNITED STATES PATENT OFFICE

NORMAN ROBERT CAMPBELL, OF WATFORD, ENGLAND

MANUFACTURE OF PHOTO-ELECTRIC TUBES

Application filed December 1, 1928, Serial No. 323,100, and in Great Britain December 1, 1927.

This invention relates to the manufacture of photoelectric tubes and has for its object the production of tubes that are highly sensitive to red light.

At the outset some terms must be defined. A photoelectric tube is a device in which light excites the emission of electrons from a surface used as the cathode of an electric discharge through a vacuum or through a gas; selenium cells and similar devices in which light causes a change in the resistance of a solid or liquid conductor are excluded. A photo-sensitive material is one from which light within the range of the visible spectrum can excite the emission of electrons. The sensitivity of a cathode is measured by the saturated electronic current flowing from it in a vacuum when its surface receives a flux of light given in amount and in quality. The relative sensitivity of two cathodes thus defined is almost independent of the amount of the flux, but may depend greatly on its quality. In what follows, unless the contrary is expressly stated, the red sensitivity means the sensitivity when the light is of wave-length 6500A, the blue sensitivity that when the light is of wave-length 4800A.

When red and blue sensitivities are compared the ratio of the red and blue fluxes is supposed to be that in light from a tungsten source at 2600° K. The photoelectric threshold is the longest wave-length for which the cathode has any measurable sensitivity.

The normal process of preparing a photoelectric tube is that originally due to Elster and Geitel. The cathode is a silvered portion of the wall of the vessel; the anode an electrode of much smaller area supported within it. The photo-sensitive metal is introduced into the vessel usually in the liquid or gaseous form and concentrated on the cathode. The tube is then "sensitized" by filling it with hydrogen to a pressure of the order of 1 mm. and passing an electric discharge with the cathode of the tube as the cathode of the discharge. The hydrogen is then evacuated; if the tube is to be gas-filled and the primary photoelectric current amplified by ionization by collision, it is filled with argon or other rare gas to a suitable pressure.

Tubes thus prepared with potassium or sodium as the photo-sensitive material have little red sensitivity; their threshold is not much if at all, greater than 6500A. If rubidium or caesium is used, some red sensitivity will be obtained, but for practical purposes it will not be comparable with the blue sensitivity of the potassium tube; the measurement or detection of the light from the red end of the spectrum for ordinary sources will not be nearly as sensitive as that of light from the blue end.

I have found that in some circumstances the red sensitivity of tubes prepared in this manner can be greatly increased, if, before hydrogen is introduced and the discharge passed, the visible layer of photo-sensitive material on the cathode is driven therefrom by the application of heat. It is known that after the visible mass of the material is driven off, a very thin layer, probably of monomolecular thickness remains; it is this layer that is red sensitive, particularly after it has been sensitized by the hydrogen discharge. Alternatively, but not so conveniently, the thin layer may be formed by allowing it to accumulate slowly by condensation from the vapour of the material at about room temperature.

According to the invention, the cathode of a photoelectric tube consists of a surface covered with a very thin, invisible, layer of photo-sensitive material, which has been sensitized after its formation, by an electric discharge in hydrogen. Preferably the thin layer is formed by driving off a thick visible layer by the application of heat.

One method of making photoelectric tubes according to the invention will now be described by way of example. The tube is shown in the accompanying drawing. This form of tube is well known and no claim is made to the shape of the envelope or the arrangement of the electrodes within it. The invention can be applied to any of the known forms of tube, and this form is merely given by way of illustration. The glass vessel 1 contains the electrodes 2 and 3, connected to the exterior by the leads 4 and 5 respectively.

The electrode 2 is a layer of silver deposited chemically on the bottom of the tube, and the electrode 3 a nickel gauze. The tube is connected to an exhaust pump through the tube 6 and through the tube 7 to a vessel 8 containing a little potassium 9. After the tube has been baked and exhausted and cooled, potassium is introduced by heating the tube 7 and vessel 8; the tube 7 is then sealed off. The potassium is deposited on the electrode 2 by heating the remainder of the tube while the part 2 is cooled. When the whole vessel is cooled, the electrode 2 is heated gently by a flame, whilst a window is preserved at the top of the tube also by heating it. A stage is reached at which the visible layer of potassium on the part 2 disappears rapidly; as soon as it has gone, hydrogen is introduced to a pressure of about 1 mm. and the whole tube allowed to cool. The presence of the hydrogen prevents further diffusion of the potassium. When the tube is cool, an electric discharge carrying a few milliamperes is passed with the part 2 as cathode and the part 3 as anode for a period, to be determined by trial, of the order of one minute. The cathode will now be found to be much more sensitive to the red than a cathode of potassium prepared in the ordinary manner, and more sensitive than a cathode of cæsium so prepared. The tube may be then completed in a known manner.

This process will give regularly a considerable red sensitivity; but the results are somewhat variable and the precise conditions that determine the best results are not easy to ascertain. It appears that the ultimate red sensitivity is determined largely by the initial condition of the silvered coating, and probably by an oxygen-containing film on its surface. Thus, procedures that tend to remove oxygen very completely should be avoided; it may even be desirable to admit oxygen just before the potassium is introduced or even during its introduction.

If other metals are substituted for potassium in carrying out this process, it will again be found that the red sensitivity of the sensitized thin film is greater than that of the same metal in bulk. But the increase in red sensitivity obtained by substituting the thin film for the thick will not be as great if cæsium is used as if potassium is used. Accordingly, though cæsium in bulk is more red sensitive than potassium in bulk, the red sensitivity of the thin potassium film is normally greater than that of the thin cæsium film.

I claim:—

1. In the manufacture of photoelectric tubes, the process for the formation of a red-sensitive cathode comprising forming a very thin and normally invisible film of a photo-sensitive material on the metal cathode of the tube, then admitting hydrogen into the said tube, and thereafter passing an electric discharge through the hydrogen in the tube.

2. In the manufacture of photoelectric tubes, the process for the formation of a red-sensitive cathode comprising depositing a thick layer of photo-sensitive material on the metal cathode of the tube, applying heat to drive off most of the deposit thereby leaving a very thin and normally invisible film of said photo-sensitive material on the said cathode, filling the tube with hydrogen and thereafter passing an electric discharge through the hydrogen in the tube.

3. In the manufacture of photoelectric tubes, the process for the formation of a red sensitive cathode therefor, comprising establishing on the metal cathode of the tube a very thin and normally invisible film of substantially mono-molecular thickness of a photo-sensitive material, thereafter sensitizing the said film by filling the tube with hydrogen and passing an electric discharge through the hydrogen filled tube cell.

NORMAN ROBERT CAMPBELL.